United States Patent Office

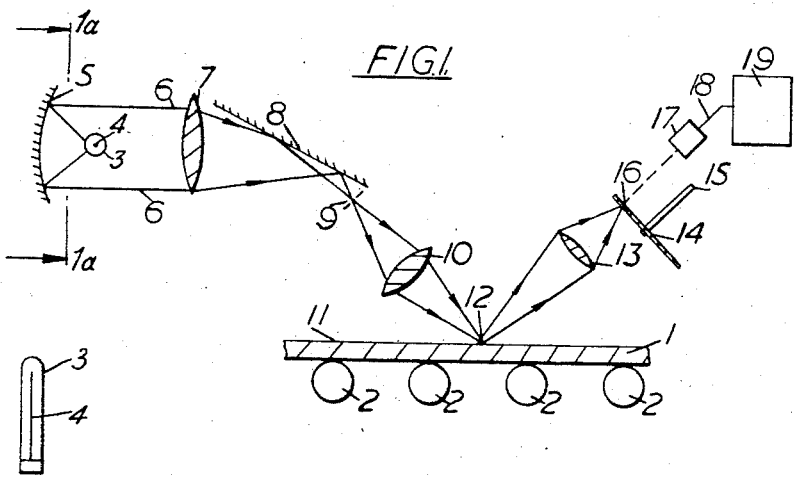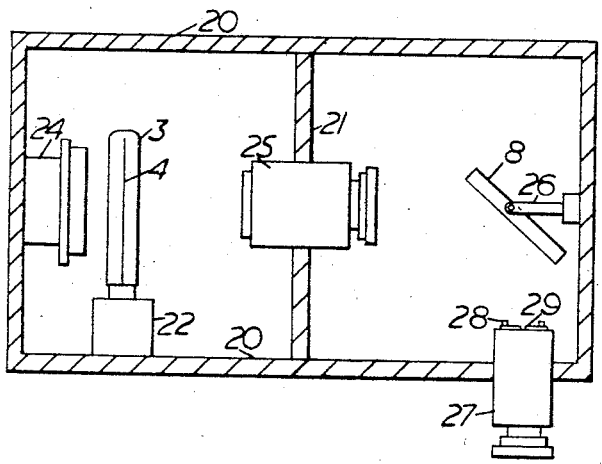

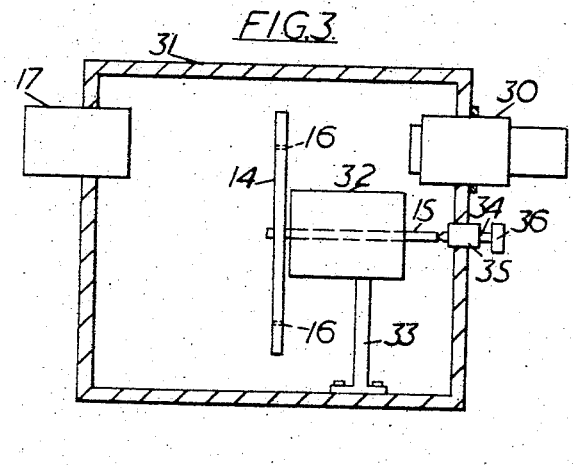
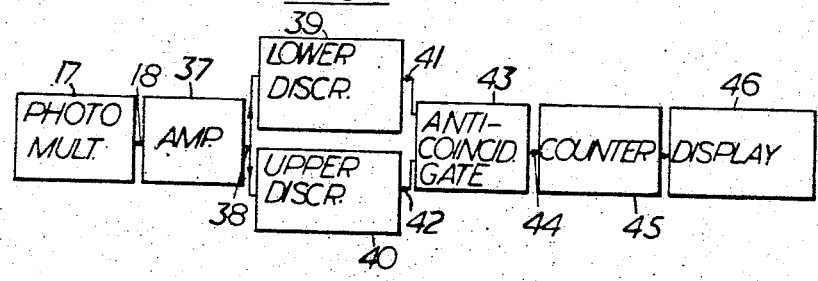

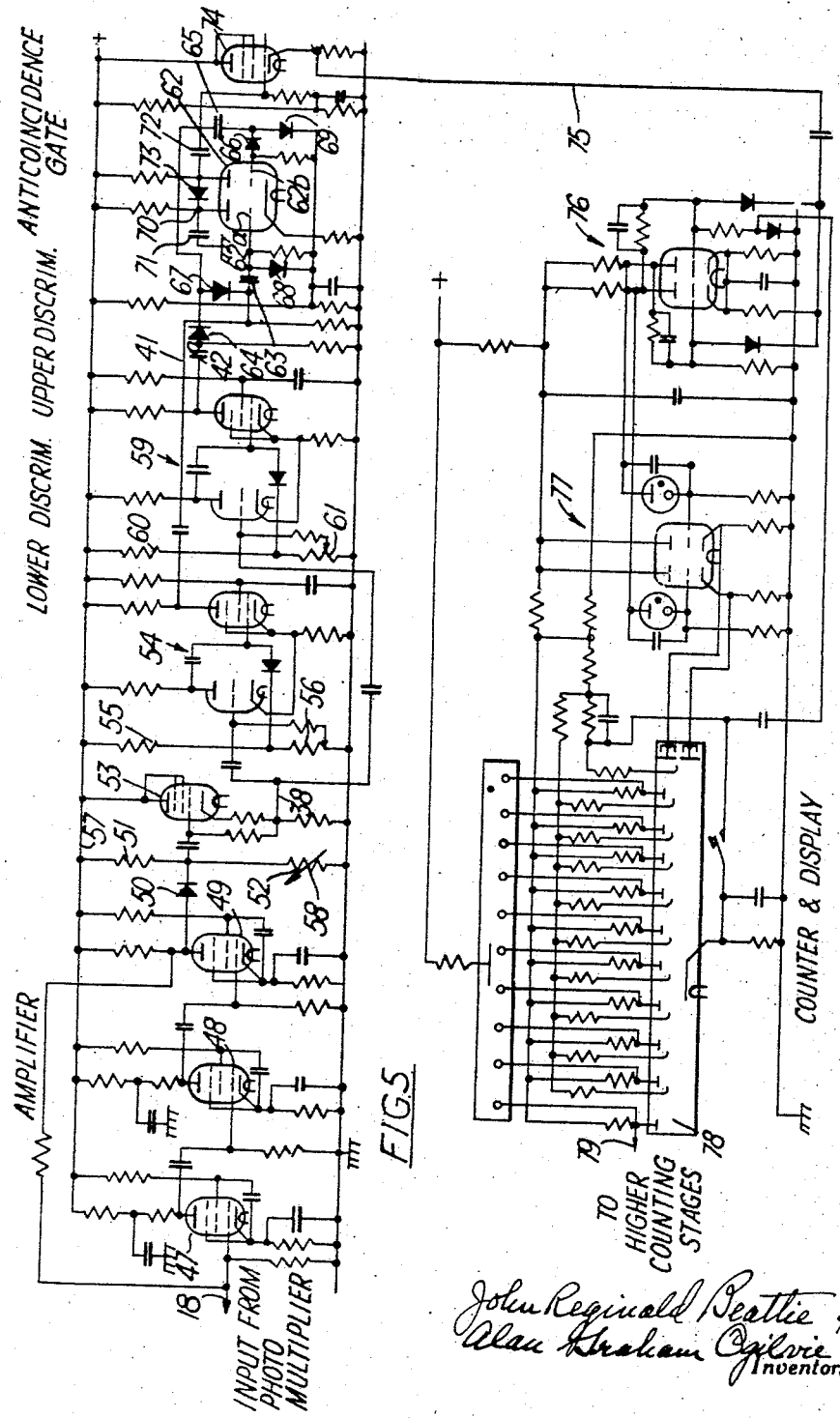

3,427,109
Patented Feb. 11, 1969

3,427,109
REFLECTION TESTING APPARATUS WHICH DETECTS PITS IN SHEET MATERIAL
John Reginald Beattie, Maghull, near Liverpool, and Alan Graham Ogilvie, Norton, near Daventry, England, assignors to Pilkington Brothers Limited, Liverpool, England, a corporation of Great Britain
Filed May 18, 1964, Ser. No. 368,252
Claims priority, application Great Britain, May 26, 1963, 20,273/63
U.S. Cl. 356—237                4 Claims
Int. Cl. G02b 1/00; G01n 21/16, 21/32

ABSTRACT OF THE DISCLOSURE

Indications of the presence and character of pits in the surface finish of flat glass or the like is obtained by processes and apparatus of and for illuminating strip-shaped zones on the surface, detecting from reflected light the presence and character of any pits on the surface by producing electrical signals, and analyzing the signals, as for use in grinding apparatus for removing pits from the surface.

---

This invention relates to the manufacture of flat material, e.g. flat glass or metal, and in particular to the manufacture of flat material in which a desired surface finish is obtained by surface treatment of the material. The surface treatment may be, for example the grinding and polishing of the surfaces of flat glass, the machining of a flat surface on a metal workpiece, or the plating of a surface of sheet metal, for example tin plating of sheet steel.

The surface finish of flat material which has been so treated may be subject to defects such as surface pits which may be present due to the action of abrasive in a grinding and polishing operation, or in a machining operation, or due to non uniform plating on a plated metal surface.

It is a main object of the present invention to provide an improved method of an apparatus for detecting the presence of surface pits in a treated surface of flat material.

A further object of the invention is to porvide for control of the surface treatment of flat material to produce a surface finish of desired quality.

Accordingly, the present invention comprises, in the manufacture of flat material, successively illuminating contiguous strip-shaped zones of a surface of the material, forming from light reflected from the surface an image of the illuminated zone of the surface, scanning the whole of the image to detect the image of any pit in the surface, producing an electrical signal indicative of the presence and size of any detected pit, and analysing the signal to obtain an indication of the quantity of the surface in terms of the distribution of pits in the surface.

Further the present invention comprehends in the continuous manufacture of flat material in ribbon form, controlling the surface finish of the material by applying a surface treatment to the flat material as it is advanced, successively illuminating contiguous strip-shaped zones of the treated surface, forming from light reflected from the surface an image of the illuminated zone of the surface, scanning the whole of the image to detect the image of any pit in the surface, producing an electrical signal indicative of the presence and size of any detected pit, and analysing the signal to obtain an indication of the distribution of pits in the surface.

The invention further provides in the continuous manufacture of flat glass in ribbon form having a ground surface, controlling the finish of the ground surface by successively illuminating contiguous strip-shaped zones of the surface as the ribbon of glass is advanced, forming from light reflected from the surface an image of the illuminated zone of the surface, scanning the whole of the image to detect the image of any pit in the surface, producing an electrical signal indicative of the presence and size of any detected pit, analysing the signal to obtain an indication of the distribution of pits across the surface transversely to the direction of advance of the ribbon, and controlling the grinding of the surface in dependence on said indication to maintain a uniform surface finish across the ribbon.

Preferably, according to the invention the electrical signal is so analyzed that each detected pit is recorded as falling in one of a number of groups of pit sizes.

The invention also comprehends apparatus for use in the manufacture of flat material, by detecting pits in a surface of the flat material, comprising means for supporting said flat material, a strip light source arranged to illuminate a strip-shaped zone of a surface of the flat material, an optical system arranged to receive light reflected from said illuminated zone and to form an image thereof, scanning means operable to scan the whole of said image, means for effecting relative movement between said supporting means and the light source and optical system so that the images of contiguous strip-shaped zones of the surface are scanned in succession by the scanning means, a photoelectric device associated with the scanning means and responsive to an image of a pit to produce an electrical signal indicative of the presence and size of the pit, and a signal analysing device connected to the photoelectric device and operable to record the signal selectively according to the size of the detected pit.

In a preferred embodiment of the invention the light source is a line filament lamp which is arranged to illuminate a slit forming part of an optical means operable to focus an image of the slit on the surface to be inspected thereby illuminating a strip-shaped zone thereof, the optical system is arranged to receive light reflected from the illuminated strip-shaped zone and to focus an image of the zone on a scanning disc, which disc is mounted on driving means for rotating the disc and has at least one pin hole formed therein to scan the whole of the image formed on the disc as the disc rotates, and wherein the photoelectric device is a photomultiplier tube arranged to receive light passing through the pin hole in the scanning disc.

Preferably, according to the invention the photomultiplier tube is connected to a discriminator circuit operable to produce an output when the strength of a pit-indicating signal from the photomultiplier tube is within set limits defining a range of pit sizes, and the output from the discriminator circuit is connected to a counter which is operable to record the number of detected pits falling within that range.

In a preferred signal analysing device according to the invention the discriminator circuit comprises two trigger circuits whose inputs are connected in common to the output from the photomultiplier tube, and whose outputs are connected to the two sides of an anticoincidence gate, and the trigger circuits have different trigger thresholds respectively corresponding to the upper and lower limits of said range of pit sizes, so that an output is transmitted from the gate to the counter only when the lower limit trigger circuit is triggered.

Where more fine quality control of manufacture is desired the discriminator circuit comprises at least three trigger circuits whose inputs are connected in common to the output from the photomultiplier tube, one of the trigger circuits has a trigger threshold corresponding to the lower limit of a first range of pit sizes, a second trigger circuit has a trigger threshold corresponding to the upper limit of that range, and each other trigger circuit has a trigger threshold corresponding to the upper limit of a succeeding range of pit sizes, and a number of output channels each corresponding to the range of pit sizes to be recorded and each including an anticoincidence gate connected to the trigger circuits for the limits of the range, and a counter connected to the gate and operable to record the number of detected pits in that range.

The invention also comprehends flat material having a surface finish of desired quality produced by a method as set out above, for example flat glass having a ground surface produced by the method according to the invention.

In order that the invention may be more clearly understood some embodiments thereof will now be described, by way of example, with reference to the diagrammatic accompanying drawings, in which:

FIGURE 1 is a schematic diagram showing the arrangement of the optical apparatus according to the invention, FIGURE 1a is a view at right angles to FIGURE 1 on the line 1a—1a of FIGURE 1 further illustrating the same, FIGURE 2 is a section through an optical system for illuminating a strip-shaped zone of a surface of flat material, FIGURE 3 is a sectional view similar to FIGURE 2 showing apparatus including scanning means for receiving light reflected from the illuminated zone of the flat material, FIGURE 4 is a block circuit diagram of a single channel signal analysing circuit for use in analysing electrical signals produced from the reflected light, and FIGURE 5 is a detailed circuit diagram of a part of the circuit shown in FIGURE 4.

In the drawings like reference numerals designate the same or similar parts.

Referring to FIGURES 1 and 1a of the drawings, apparatus for detecting surface pits in a surface of flat material is illustrated diagrammatically. Flat material to be sensed, for example flat ground glass, or flat metal having a machined surface, or plated flat metal, is indicated at 1 being supported on horizontal conveying rollers 2. The rollers 2 are driven so that the material 1 is advanced relative to the optical arrangements to be described below.

The light source consists of a lamp 3 having a line filament 4. A concave mirror 5 is arranged behind the lamp so that light from the line filament 4 is directed as indicated at 6 to a lens 7 which forms an image of the line filament. Alternatively the back face of the envelope of the lamp may be silvered to provide a concave reflecting surface. Light transmitted through the lens falls on an inclined plane mirror 8 and the image of the filament 4 is formed on an optical slit of adjustable opening which is indicated at 9. The illuminated optical slit 9 thus constitutes an optically defined strip light source. Light diverging from the slit 9 is collected by a condensing lens 10 which focuses an image of the illuminated slit 9 on to the upper surface 11 of the flat material which is being advanced under the optical means. That is the lens 10 illuminates a strip-shaped zone 12 of the upper surface 11 of the flat material.

Light reflected from the illuminated strip-shaped zone 12 is focused by an objective lens 13 on to one face of a scanning disc 14 which is mounted for rotation on a central axis 15, being driven by a motor to be described below.

There is at least one pinhole 16 formed in the disc and the disc is so aligned relative to the lens 13 that a strip-shaped image formed on the disc 14 of the illuminated zone 12 is completely scanned by the pinhole 16 as the disc rotates.

A photomultiplier tube indicated diagrammatically at 17 is mounted behind the scanning disc 14 and receives light which passes through the pinhole 16 in the scanning disc. The photomultiplier tube 17 is connected to supply circuits, not shown, of known kind and produces an output signal which varies with any variation in the intensity of illumination in the image formed on the scanning disc 14. The flat material 1 may be ground glass, for example ground glass which has yet to be passed under polishing heads. It has been found that such ground glass has in its surface minute pits which, if they are not completely polished away, would render the glass unsuitable for some uses, particularly for use as a mirror.

The surface pits are not regularly disposed but are dotted about on the surface, and it has been found that there is a particular distribution of pits on the surface of ground glass dependent on the grinding operation. For example, the marginal areas of a ribbon of ground glass may contain more objectionable pits than the central region of the glass. The size of the pits is, for example of the order of 5 to 10 microns, although there will be pits having sizes both above and below this range. It is thought that the deeper the pit the more light reflects from it so that pits appear in the image of the illuminated zone 12 of the glass as bright spots. Because of the magnification of the optical system a pit which is, for example about .0005" size appears as a bright spot of the order of .002" size in image and the diameter of the pinhole 16 in the scanning disc is about .002". That is, the pinhole diameter is comparable with the size of the bright spots which appear in the image when there is a pit in the illuminated zone 12 of the surface of the glass.

Only one pinhole 16 is indicated in FIGURE 1, but for a faster working there may be, for example four equispaced pinholes around the scanning disc 14, the speed of rotation of the disc 14 being so related to the rate of advance of the flat material 1 by the rollers 2 on which it is supported that the whole surface of the flat material 1 is scanned. That is, there is adjacent light scanning of the surface.

The output from the photomultiplier 17 is fed on a line 18 to a signal analysing device 19 to be described in greater detail below, the electrical signal on the line 18 being indicative both of the presence and size of any pits in the illuminated glass surface.

The lamp 3 and its associated optical system is illustrated in more detail in FIGURE 2, being housed in a casing 20 which has a central partition 21. The lamp 3 is mounted on a socket base 22 fixed to the floor of the casing 20 and behind the lamp fixed in an end wall of the casing 20 is a housing 24 for a fan and a motor driving the fan. The fan is an extractor fan which draws a cooling air stream through the casing 20.

Light from the filament 4 is collected by an optical system 25, replacing the lens 7 shown diagrammatically in FIGURE 1, which optical system is mounted in a central aperture in the partition 21. The plane mirror 8 is pivotally mounted between brackets 26 fixed to the opposite end wall of the casing 20, and directs light downwardly through a lens system 27 fixed in the floor of the casing. The optical slit 9 is defined between optically finished members 28 and 29 which are adjustably mounted at the inlet end of the optical system 27. That is, the image of the light filament 4 is formed on the slit 9 defined between the members 28 and 29 which thereby acts as the strip light source, and image of which is focused by the lens system 27 on to the surface of the flat material to illuminate a strip-shaped zone 12 of that surface.

Light reflected from the surface of the flat material 1 is received by an objective lens system 30 which performs the function of the lens 13 illustrated diagrammatically in FIGURE 1. The lens system 30 is mounted in an aperture in one wall of a casing 31 which contains the scanning disc 14 and its associated driving motor 32 which is supported in the casing by a bracket 33. The shaft 15 on which the scanning disc 16 is mounted is carried by the motor bearings. The other end of the shaft is supported by a plunger 34 which passes through a bush 35 in the casing wall and has a knurled head 36 outside the casing, which head is used for manual rotation of the motor 32. The motor 32 is a cage motor which surrounds the shaft 15 and is supplied with power through connections, not shown, into the casing.

The photomultiplier tube 17 is also mounted in an aperture in the casing 31 in the wall opposite the wall in which the lens system 30 is mounted, and the scanning disc 14 is arranged centrally and off-set with respect to the lens system 30 and the photomultiplier 17 so that the pinholes 16 in the scanning disc 14 are in alignment both with the lens system 30 and the photomultiplier 17. Thus the photomultiplier 17 receives light in the form of a continuous light signal as adjacent strip-shaped zones on the surface 11 are scanned.

The ground surface which is being scanned is classified according to the application for which it can be employed which is dependent on the size and number of surface pits. For example, the glass having pits only smaller than 5 microns is suitable, after polishing, for mirrors and it may therefore be desired to classify glass as to whether or not it is suitable for silvering. It may for other Applications be desired to classify the glass more rigorously in accordance with surface quality, for example where there are pits in the ranges 5 to 7 microns, 7 to 10 microns and above 10 microns.

In order to obtain an indication of the quality of the surface in terms of the distribution of pits in the surface, the signal from the photomultiplier 17 at line 18 is analysed by the signal analysing device 19 which includes at least one discriminator circuit operable to produce an output when the strength of a pit indicating signal from the photomultiplier 17 is within set limits defining a range of pit sizes. There may be one or more channel in the signal analysing means 19 and one of these channels will now be described with reference to FIGURES 4 and 5.

The line 18 is connected to an amplifier 37 which has an output on line 38 which is connected to a discriminator circuit which comprises two trigger circuits 39 and 40 whose inputs are connected in common to line 38 and whose outputs are connected by lines 41 and 42 respectively to the two sides of an anticoincidence gate 43. The output from this gate 43 is connected by line 44 to a counter 45 which is followed by a display unit 46 which gives a display of the count in the counter.

The discriminator trigger circuits 39 and 40 are Schmitt trigger circuits to be described below and the bias of each trigger is such that the trigger circuit 39 will be triggered by a pit indicating signal corresponding to the lower limit of a range of pit sizes for example of 5 microns size, while the bias on the trigger circuit 40 is such that it is triggered by pit indicating signals of strength corresponding to the upper limit of a range of pit sizes, for example 7 microns. When both trigger circuits 39 and 40 are triggered there is no output from the gate. That is, when the signal is greater than the upper limit and an output is obtained on line 44 only when the lower trigger circuit 39 is triggered. This results in a pulse being fed to the counter 45 which is therefore stepped on when the signal from the photomultiplier indicates a pit lying within that range of sizes. It will be appreciated that the signal analysing means 19 may contain a number of such channels, for example there may be a second channel which consists of a further trigger circuit linked to the upper trigger circuit 40, the further trigger circuit receiving the output from the amplifier 38 and having its output connected to a second anticoincidence gate whose other output is connected to line 42 so that this second anticoincidence gate only produces an output when the pit indicating signals indicate a pit of size, for example lying between 7 and 10 microns. The second anticoincidence gate would have its own counter and display unit.

The single channel analyser of FIGURE 4 is illustrated in greater detail in FIGURE 5. The output from the photomultiplier on line 18 is connected to a first stage 47 of the amplifier. The signal is further amplified through two further stages 48 and 49 and the output from the stage 49 is clamped to a suitable voltage by a diode clamp 50 operating in conjunction with the resistor chain 51, 52, the resistor 52 being variable.

The output from the amplifier is fed through a cathode follower 53 to the upper and lower discriminator trigger circuits, this output being on line 38. The lower trigger circuit is a capacity coupled Schmitt trigger circuit indicated generally at 54. The bias for this trigger circuit is obtained from a voltage divider consisting of resistors 55 and 56, the latter being a variable resistor to adjust the bias on the grid of the Schmitt trigger circuit. This voltage divider is connected between the HT line 57 and the earth line 58. Because of the bias is obtained from a voltage divider the trigger circuit 54 is less sensitive to drift of resistor values.

The signal on line 38 is also capacity coupled to the upper trigger circuit which is indicated generally at 59. This trigger circuit is biased from the voltage divider 60, 61, connected between lines 57 and 58 and by adjustment of the contact on the resistor 61 the appropriate bias for the upper level of the range is obtained.

The outputs from the trigger circuits 54 and 59 are fed on lines 41 and 42 respectively to the anticoincidence gate which comprises a double triode valve 62 and associated circuits. Line 41 is connected through a condenser 63 to one grid 62a of the triode 62, and line 42 is connected through a diode 64 and a condenser 65 followed by a further diode 66 to the other grid 62b of triode 62. A diode 67 couples diode 64 to condenser 63 and there are also diodes 68 and 69 respectively coupling the grids 62a and 62b to a common grid bias circuit. One anode 70 of the triode 62 is decoupled to earth by a condenser 71 and the two anodes 70 and 72 are connected together by a diode 73, the output from the gate being taken from the anode 72 through a cathode follower 74.

The lower trigger circuit 54 is triggered before the upper trigger circuit 59 and resets later than the circuit 59. The lower trigger circuit output pulse on line 41 is differentiated by the condenser 63 and diode 68. The leading edge produces only a small positive signal at grid 62a because of the low forward resistance of the diode 68, but the trailing edge produces a negative signal at grid 62a, which gives a negative output from anode 72, if the upper trigger circuit has not been triggered.

If the upper trigger circuit has been triggered, the leading edge of the signal on line 42 charges condenser 65 via diodes 64 and 69. When the upper trigger circuit resets condenser 65 remains charged and provides the necessary memory. When the lower trigger circuit resets a negative signal is fed simultaneously to both grids 62a and 62b and hence there is no output. Any small positive signal appearing at the anode of 72 as a result of this signal to grids 62a and 62b is clamped out by diode 73 and there is no output on line 75 connected to the cathode follower 74. That is, only when the lower circuits 54 alone is triggered does an output pulse appear on line 75 for feeding to a trochotron drive circuit of known construction indicated at 76 and 77. This drive circuit alternatively pulses the grids of the trochotron drive circuit which drive digitron display units which also act as counters, one of which is indicated at 78. The higher counting stages also comprising digitrons are connected to a line 79. The digitron counters and display unit operates in well-known manner to display visually the count of pits lying within the ranges which have been sensed.

Thus the quality of the surface of the material 1 is known in terms of the distribution of pits in the surface and in the case of a ground glass surface the grinding of the surface of the ribbon of glass can be adjusted to remove the larger pits and thereby to maintain a uniform surface finish suitable for the desired application. The apparatus according to the invention could be used either for adjacent line scanning of a sample of glass cut from the production ribbon or the apparatus could be caused to scan over the surface of the ribbon as it is advanced by being mounted on a bridge over the path of the ribbon or a number of scanning units could be set up side-by-side over the path of the ribbon to perform the desired scanning over the whole width of the ribbon. Although a mechanical scanning arrangement has been described this may be replaced where convenient by cathode ray tube scanning in which either the single line scan on the face of a cathode ray tube is employed or an area scan which uses a raster on the face of the cathode ray tube. There would be a definite relation between the number of lines in the raster and the speed of movement in the material, and a built in correction would be made in the counters.

As well as determining the quality of ground glass surfaces the apparatus according to the invention may be employed for inspecting ground or milled metal surfaces or plated metal surfaces. In order to improve the reflection of light from the surface, in particular when inspecting a sample of glass having a ground surface, the surface to be inspected may be aluminised to give a good reflection. Also when inspecting a sample cut from a larger piece of material the sample may be set up vertically on a traversing table and the units of FIGURES 2 and 3 may then be mounted horizontally and pointing towards the sample on the table.

There is thus provided a method of obtaining an indication of the quality of a surface in terms of distribution of pits in the surface and producing a record which gives the number of pits in the surface in terms of a distribution of different pit sizes so that the flat material which is sensed can be sorted into different quality ranges depending on its surface finish and in addition the surfacing process being carried out on the material can be adjusted to give a desired surface finish which is preferably uniform across the whole surface of the material.

We claim:

1. Apparatus for use in the manufacture of flat material, by detecting pits in a surface of the flat material, comprising means for supporting said flat material, a strip light source arranged to illuminate a strip-shaped zone of a surface of the flat material, an optical system arranged to receive light specularly reflected from said illuminated zone and to form an image thereof, scanning means operable to scan the whole of said image, means for effecting relative movement between said flat material on said supporting means and the light source and optical system so that the images of contiguous strip-shaped zones of the surface are scanned in succession by the scanning means, a photoelectric device associated with the scanning means and responsive to an image of a pit to produce an electrical signal indicative of the presence and size of the pit, and a signal analysing device connected to the photoelectric device and including discriminating means operable to analyse each signal as falling within one of a series of ranges of pit sizes, and means operable to record the signal selectively in one of said ranges according to the size of the detected pit.

2. Apparatus according to claim 1, wherein the light source is a line filament lamp which is arranged to illuminate a slit forming part of an optical means operable to focus an image of the slit on the surface to be inspected thereby illuminating a strip-shaped zone thereof, the optical system is arranged to receive light specularly reflected from the illuminated strip-shaped zone and to focus an image of the zone on a scanning disc, which disc is mounted on driving means for rotating the disc and and has at least one pin hole formed therein to scan the whole of the image formed on the disc as the disc rotates, and wherein the photoelectric device is a photomultiplier tube arranged to receive light passing through the pin hole in the scanning disc.

3. Apparatus according to claim 2, wherein the photomultiplier tube is connected to a discriminator circuit operable to produce an output when the strength of pit-indicating signal from the photomultiplier tube is within set limits defining a range of pit sizes, and the output from the discriminator circuit is connected to a counter which is operable to record the number of detected pits falling within that range.

4. Apparatus according to claim 3, wherein the discriminator circuit comprises two trigger circuits whose inputs are connected in common to the output from the photomultiplier tube, and whose outputs are connected to the two sides of an anticoincidence gate, and the trigger circuits have different trigger thresholds respectively corresponding to the upper and lower limits of said range of pit sizes, so that an output is transmitted from the gate to the counter only when the lower limit trigger circuit is triggered.

References Cited

UNITED STATES PATENTS 3,257,563  6/1966  Laurent _____ 250—219
3,160,741  12/1964 Gottschall et al. ____ 250—219

FOREIGN PATENTS 894,570  4/1962  Great Britain.

JEWELL H. PEDERSEN, *Primary Examiner*

O. B. CHEW, *Assistant Examiner.*

U.S. Cl. X.R.

356—200; 250—219, 224

UNITED STATES PATENT OFFICE
CERTIFICATE OF CORRECTION

Patent No. 3,427,109  Dated  February 11, 1969

Inventor(s) John Reginald Beattie et al.

It is certified that error appears in the above-identified patent and that said Letters Patent are hereby corrected as shown below:

Column 1, line 9, "May 26, 1963" should read
-- May 21, 1963 --.

Signed and sealed this 25th day of August 1970.

(SEAL)
Attest:

EDWARD M. FLETCHER, JR.
Attesting Officer

WILLIAM E. SCHUYLER, JR.
Commissioner of Patents